Patented July 27, 1954

2,684,981

UNITED STATES PATENT OFFICE 2,684,981

RECOVERY OF LEVULINIC ACID

Edward Sherman, Chicago, Ill., assignor to The Quaker Oats Company, Cook County, Ill., a corporation of New Jersey No Drawing. Application November 19, 1951, Serial No. 257,176

6 Claims. (Cl. 260—526)

This invention relates to the recovery and purification of levulinic acid and more particularly to the extraction of levulinic acid from aqueous mixtures containing the same.

In the production of levulinic acid by the treatment of carbohydrate materials with an aqueous solution of a mineral acid such as dilute sulfuric acid, a mixture of products is obtained including insoluble humus materials, levulinic acid, formic acid, and colored products. Various methods have been proposed for recovering levulinic acid in a pure state from such mixtures. Generally the insoluble materials are first removed by filtration and then the levulinic acid is recovered in a more or less pure state from the filtrate by extraction with a solvent. Specific solvents employed in the prior art include diethyl ether, normal butyl alcohol and methylene chloride. Since each of these solvents possesses certain disadvantages, the results, obtained using these solvents have not been entirely satisfactory. For example, the distribution of levulinic acid between ether and water is unfavorable which means that a very large amount of ether must be used to secure practical recoveries of acid. In addition, ether is very volatile and highly inflammable, making it a distinct fire hazard. Although methylene chloride is not inflammable and its distribution coefficient is about one and one-half times as great as in the case of ether, it is very volatile and toxic making it an industrial hazard. Normal butyl alcohol extracts a certain amount of colored materials and mineral acid along with levulinic acid making a second purification step necessary for the recovery of useable levulinic acid.

It is, therefore, an object of the present invention to provide an improved method of purifying levulinic acid and particularly of recovering levulinic acid from reaction mixtures and the like containing impure levulinic acid which obviates the disadvantages of the prior art methods. It is another object of this invention to provide a method for recovering levulinic acid that is simple and effective. It is yet another object of my invention to provide a method for recovering levulinic acid from crude aqueous solutions of the same obtained by the treatment of carbohydrate materials with dilute aqueous solutions of mineral acids which method eliminates the necessity of removing insoluble humus materials prior to extraction. It is a further object of the present invention to provide an improved method of recovering levulinic acid from crude mixtures which method involves the use of a solvent that is a good solvent for levulinic acid.

These and still further objects will be obvious as this invention is hereinafter more fully described.

The foregoing objects are accomplished in accordance with the present invention by extracting aqueous mixtures of crude levulinic acid with methyl isobutyl ketone; known also as 4-methyl-2-pentanone. I have discovered that methyl isobutyl ketone is an excellent solvent for this purpose in that it is selective in its action and that its ability to extract levulinic acid from aqueous solutions or mixtures is much greater than the solvents mentioned in the prior art. As compared to diethyl ether and methylene chloride the distribution coefficient of methyl isobutyl ketone is about 2¼ and 1½ times as great, respectively, as for the solvents mentioned.

One method of practicing the present invention is to subject crude levulinic acid mixtures to extraction with methyl isobutyl ketone. If desired the insoluble humus materials may be removed from the mixtures by filtration prior to extraction. Such a procedure, however, is not essential for the efficient operation of the process as the levulinic acid can be recovered from crude mixtures containing such insoluble materials with equal facility. Extraction may be carried out either as a batch or as a continuous method of operation. If the former method is employed about 1 part by volume of the crude aqueous levulinic acid is extracted with an equal volume of methyl isobutyl ketone. The ketone layer is removed, the aqueous layer is extracted with fresh ketone and the process is continued until the levulinic acid has been removed as completely as is considered practical from the aqueous solution. After extraction has been completed, the levulinic acid may be recovered from the methyl isobutyl ketone in a relatively pure form by distilling off the methyl isobutyl ketone so as to leave a residue of the recovered acid. If a continuous method of operation is employed the methyl isobutyl ketone being lighter than water or an aqueous levulinic acid solution is allowed to flow upward against a descending stream of the aqueous mixture containing the levulinic acid. I have found that by the use of an efficient extractor and using about two times as much methyl isobutyl ketone as aqueous levulinic acid by volume, it is possible to remove all but about 0.1% of the levulinic acid from the aqueous layer. The methyl isobutyl ketone thus discharged from the extractor may contain from 5% to 20% levulinic acid, depending upon the initial concentration of the aqueous solution subjected to extraction and the volume of methyl isobutyl ketone used compared to the volume of aqueous acid extracted. It is, of course, necessary to use the liquid-liquid extractor in such a way that a lower aqueous phase and an upper ketone phase are present thus permitting the withdrawal of the aqueous layer substantially free of ketone from the base of the column and the withdrawal of the ketone layer substantially free of water from the top of the column. The levulinic acid may be recovered from the methyl isobutyl ketone layer as in the batch process by distilling off the ketone leaving a residue of the recovered acid. The recovered acid so obtained by either process is substantially free from colored materials and other impurities. If an especially pure product is desired, the levulinic acid may be further purified by recrystallization or by vacuum distillation.

Aside from the advantages indicated above which result from the use of methyl isobutyl ketone for the present purpose it should be mentioned that under the conditions employed methyl isobutyl ketone is very stable and thus may be recovered economically by distillation. Also in view of the large difference between the boiling points of methyl isobutyl ketone and levulinic acid, it is obvious that their separation can be easily accomplished by distillation.

As the foregoing description is illustrative only, not restrictive in nature, it is to be understood that many different embodiments of the present invention may be practiced without departing from the spirit and scope thereof, except as is limited by the following claims.

I claim:

1. A process for recovering levulinic acid from an aqueous solution which comprises extracting said aqueous solution with methyl isobutyl ketone.

2. A process for recovering levulinic acid from an aqueous solution which comprises subjecting said aqueous solution to a counter-current flow of methyl isobutyl ketone in an extractor.

3. In a process for recovering levulinic acid from a crude aqueous solution obtained by heating a carbohydrate material with a mineral acid, said solution containing insoluble humus materials suspended therein, color bodies, and mineral acid as impurities, the step which comprises selectively extracting levulinic acid from said aqueous mixture with methyl isobutyl ketone.

4. In a process for recovering levulinic acid from a crude aqueous solution obtained by heating a carbohydrate material with a mineral acid, said solution containing insoluble humus materials suspended therein, color bodies, and mineral acid as impurities, the step which comprises selectively extracting levulinic acid from said aqueous mixture with methyl isobutyl ketone and separating substantially pure levulinic acid from the resulting methyl isobutyl ketone solution of levulinic acid.

5. A process for recovering levulinic acid from an aqueous solution which includes intimately contacting said aqueous levulinic acid solution with methyl isobutyl ketone allowing the mixture to separate into an upper layer composed of levulinic acid dissolved in methyl isobutyl ketone and a lower layer composed of water, dissolved color bodies and mineral acid.

6. A process for recovering levulinic acid from an aqueous solution which includes intimately contacting said levulinic acid solution with methyl isobutyl ketone allowing the mixture to separate into an upper layer composed of levulinic acid dissolved in methyl isobutyl ketone and a lower layer composed of water, dissolved color bodies and mineral acid and then removing the methyl isobutyl ketone from the separated upper layer whereby to obtain a light colored levulinic acid suitable for commercial use.

References Cited in the file of this patent

UNITED STATES PATENTS

| Number | Name | Date |
|---|---|---|
| 2,107,527 | Evans et al. | Feb. 8, 1938 |
| 2,165,438 | Alliquist | July 11, 1939 |
| 2,257,389 | Macallum | Sept. 30, 1941 |

FOREIGN PATENTS

| Number | Country | Date |
|---|---|---|
| 208,747 | Switzerland | May 16, 1940 |
| 583,533 | Great Britain | Dec. 20, 1946 |

OTHER REFERENCES

Scheibli et al., Chem. Abstracts, vol. 41, Col. 1851 (1947).

Scheibel, Chem. Abstracts, vol. 43, Cols. 2-3 (1949).